United States Patent [19]

Maerte

[11] Patent Number: 4,871,092

[45] Date of Patent: Oct. 3, 1989

[54] ATOMIZING OR METERING PUMP

[75] Inventor: Leo Maerte, Sipplingen, Fed. Rep. of Germany

[73] Assignee: Ing. Erich Pfeiffer GmbH & Co. KG, Fed. Rep. of Germany

[21] Appl. No.: 253,400

[22] Filed: Oct. 3, 1988

Related U.S. Application Data

[63] Continuation of Ser. No. 899,414, Aug. 22, 1986, abandoned, which is a continuation-in-part of Ser. No. 511,103, Jul. 6, 1983, abandoned.

[30] Foreign Application Priority Data

Jul. 10, 1982 [DE] Fed. Rep. of Germany ....... 3225910

[51] Int. Cl.$^4$ .......... G01F 11/06

[52] U.S. Cl. .......... 222/153; 222/309; 222/321; 222/41

[58] Field of Search .......... 222/41, 43, 47, 321, 222/309, 153, 402.11, 321, 383–384; 239/73

[56] References Cited

U.S. PATENT DOCUMENTS

| | | | |
|---|---|---|---|
| 3,484,023 | 12/1969 | Meshberg | 222/402.11 |
| 4,162,746 | 7/1979 | Anderson et al. | 222/321 |
| 4,273,257 | 6/1981 | Smith et al. | 222/43 |
| 4,288,006 | 9/1981 | Clover | 222/42 |
| 4,369,899 | 1/1983 | Mayers et al. | 222/321 |
| 4,433,799 | 2/1984 | Corsette | 222/320 |
| 4,454,964 | 6/1984 | Sacher | 222/309 |
| 4,589,573 | 5/1984 | Tada | 222/321 |

*Primary Examiner*—H. Grant Skaggs
*Attorney, Agent, or Firm*—Steele, Gould & Fried

[57] ABSTRACT

A dispensing pump means has an operating pusher for effecting a pump stroke and a control means for selectively varying the length of stroke. The control includes a neck on a base for receiving the operating pusher, cooperating grooves and abutment shoulders guiding the pusher and setting its maximum stroke. At least one projection positively slides in a selected one of a plurality of grooves of different lengths, the projection being positioned out of the grooves and in front of the ends of the grooves in an initial position of the pump, i.e., prior to the pump stroke. Axially preceding the ends of the grooves, an arched path extends around the pump axis and guides the projection during manual rotation of the operation pusher as the projection is positioned over the selected groove.

29 Claims, 4 Drawing Sheets

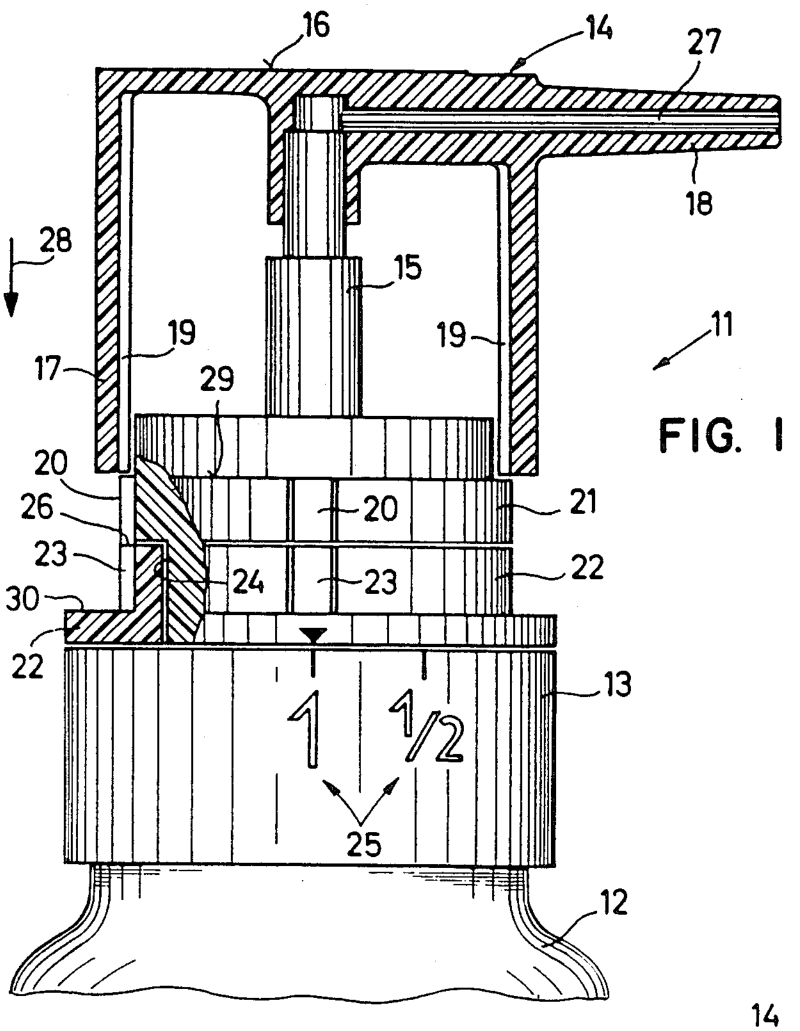
FIG. 1
FIG. 3
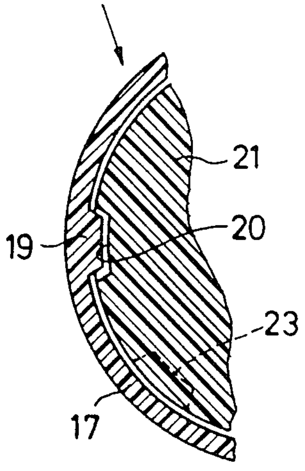
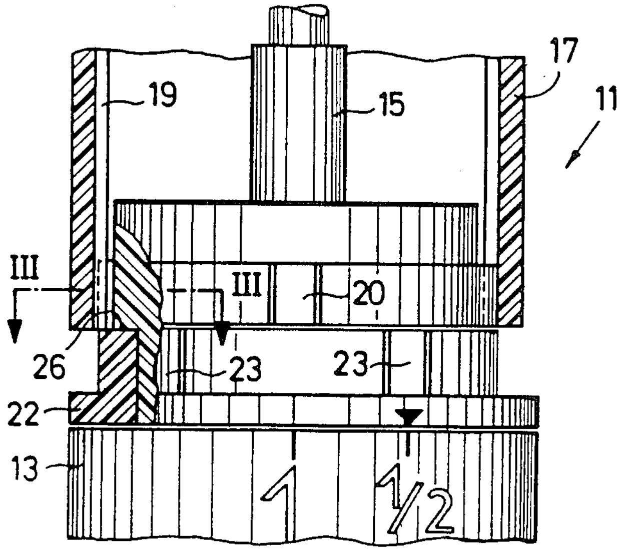
FIG. 2

ATOMIZING OR METERING PUMP

CROSS REFERENCE TO RELATED APPLICATION

This is a continuation of Ser. No. 899,414, filed Aug. 22, 1986, which is a continuation-in-part of Ser. No. 511,103, filed July 6, 1983 both now abandoned.

BACKGROUND OF THE INVENTION

The invention relates to an atomizing or metering pump with a pump casing and an operating pusher displaceable relative thereto, cooperating projections and recesses being provided on the pump casing and the operating pusher.

Such a pump is known from German Utility Model No. 79 01 055, in which the cooperating projections and recesses are used for preventing any twisting of the operating pusher with respect to the pump casing.

SUMMARY OF THE INVENTION

The problem of the invention is to further develop an atomizing or metering pump, so as to facilitate the use and increase the reliability thereof.

This problem is solved by the present invention as disclosed and claimed.

Preferably the projections and recesses for the reciprocal locking of pump casing and operating pusher can cooperate in at least one predetermined rotation position for preventing operation of the pup. This prevents operation of the pump during transportation, or in an unauthorized manner, e.g. by children. This is particularly important if it is a pump for pharmaceutical products. The term "metering pump" covers pumps for dispensing all flowable substances, such as liquid, gel-like or pasty substances.

The projections and recesses can at least partly be undercut and secure the operating pusher in a predetermined rotation position, so that it cannot be removed from the pump. Thus, in this position, which preferably coincides with the position preventing operation, it is ensured that the operating head cannot be removed from the pump piston rod which, apart from causing a possible loss of the operating pusher, could also lead to a contamination of the outlet passage. In all the described embodiments, the projections or recesses, which also covers shoulders, steps, stop faces, etc., can either be provided on the operating pusher, or on the pump casing.

It is particularly advantageous if the projections and recesses cooperate with one another for releasing a pump path, which differs as a function of the rotation position. Thus, it is possible to adjust the metering or atomizing quantity. For this purpose a projection can cooperate with a curved or preferably stepped surface. As a result of the step arrangement, there is no need for fixing the quantity setting during operation, which could otherwise be automatically changed by the action of the curved portion. The adjustment could, for example, result from a twisting of the operating pusher with respect to the pump casing. The rotary part can also be a ring mounted on the operating pusher, or preferably on the pump casing. Advantageously on the ring mounted with limited rotational freedom on the pump casing and in the adjacent area of the pump casing with respect to the operating pusher, there are axial slots which can be made to align with one another and into which can pass internal projections of the operating pusher, which overlap in this area.

A separate ring, mounted in rotary manner on the pump casing is also advantageous when securing against operation and/or removal of the operating pusher, because then in the predetermined safety rotational position the operating pusher can be rotated into a given position, e.g. for packaging purposes, independently of the position of the pump on the container, which has e.g. taken place accidentally when threading the pump onto the container. For example, this is important if both the container and the operating pusher have a non-rotationally symmetrical shape, e.g. a flat or angular container with an operating pusher having a lateral projection.

Particular preference is given to an embodiment, in which the at least one projection cooperates with a recess extending over part of the circumference and whose two ends limit the movement of the projection in the recess. In the vicinity of one end of the recess there is an axial slot permitting the axial movement of the projection.

BRIEF DESCRIPTION OF THE DRAWINGS

The invention is described in greater detail hereinafter relative to non-limitative embodiments and with reference to the attached drawing, wherein show:

FIG. 1 a vertical section through an operating pusher and part of a pump casing screwed on to a container.

FIG. 2 a corresponding view of the same construction in another operating position.

FIG. 3 a section along line III—III of FIG. 2.

DETAILED DESCRIPTION OF THE INVENTION

Figure 4:
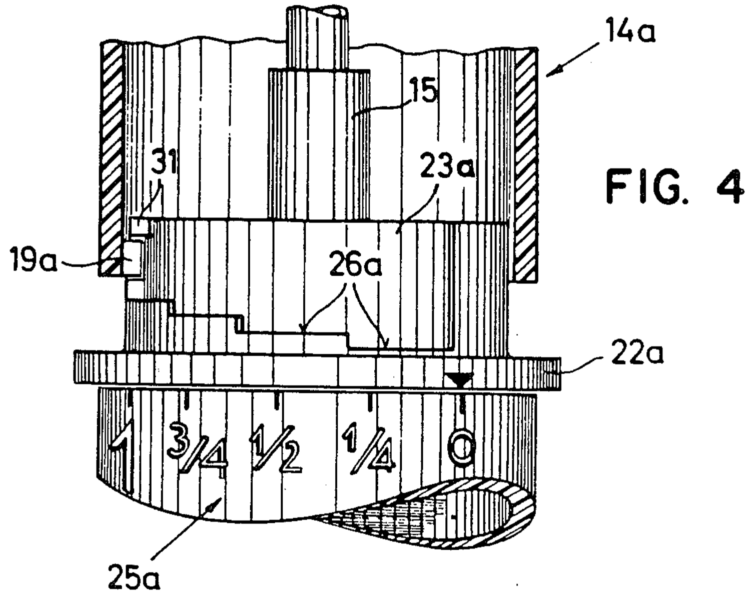
FIG. 4 a partial sectional side view of the operating pusher and pump casing of another embodiment.

FIGS. 1 to 3 show a metering or atomizing pump 11, which is screwed on to a container 12. Pump 11 has a pump casing 13, on which is provided a pump cylinder (not shown) partly projecting into the container and having a single-acting piston pump. A piston rod 15 of the pump projects upwards out of the pump casing and on to it is pressed an operating pusher 14, which has an outlet channel 27 connected to the outlet channel of the hollow piston rod. Channel 27 in a delivery pipe projects laterally over the operating pusher, which is constructed as an inverted cup-shaped part. The bottom of the cup is formed by the operating pusher face 16 on which the user presses for operating the pump in the direction of arrow 28.

The cylindrical casing 17 of the operating pusher has, in the present embodiment, on its inner face four projections in the form of axially directed ribs. Whilst the internal diameter of casing 17 is such that it overlaps an upper cylindrical area 21 of the pump casing, the projections 19 are dimensioned in such a way that they normally rest on a step 29 in area 21. In the same arrangement as ribs 19, there are four recesses 20 in area 21 and are shaped like longitudinal slots, which serve to receive the projections.

A ring 22 having a substantially L-shaped configuration is mounted in circumferentially rotary, but axially non-displaceable manner in an annular slot 24 of the pump casing. The outer face of its axially directed L-leg leads without transition to area 21 and also has recesses 23 in the form of axial slots which, through the rotation of ring 22, can be aligned with recesses 20 (cf. FIG. 1). Marks 25, corresponding to two ring positions, are provided on the outwardly projecting L-leg of the ring and on the adjacent area of pump casing 13. The rotation of the ring can be limited in these positions by arbitrarily-placed stop members (not shown). It is also possible to associate resilient catches with these two positions.

The operation of the construction according to FIGS. 1 to 3 is as follows. In the position of FIG. 1, the pump is set for full stroke (indicated by the mark "1"). The two recesses 23 are aligned. If the operating pusher 14 is now depressed, projection 19 enters the aligned recesses 20, 23 and engages against the lower shoulder 30 of ring 22, which corresponds to the full pump stroke.

In the position according to FIG. 2, the half-stroke is set by rotating ring 22. Recesses 20 and 23 are not aligned, so that projection 19 can only pass through recess 20 and then engages with the upper end face 26 of ring 22. FIG. 3 also shows this position with recesses 20, 23 displaced with respect to one another.

It is also pointed out that in this construction, the pump can be completely blocked, in that the operating pusher 14 is so turned relative to pump casing 13 that projections 19 rest on step 29 when not aligned with recesses 20. This represents the safety position against undesired operation of the pump.

FIG. 4 shows an embodiment, which permits a setting in several stages (0, $\frac{1}{4}$, $\frac{1}{2}$, $\frac{3}{4}$, 1) (marks **25*a*). For this purpose a ring 22*a* is provided having on its outer circumference a recess 23*a* in the form of a depression in the cylindrical wall of the ring, whose lower face 26*a* rises in the form of a five-step staircase. In FIG. 4, the pump is shown in position "O", in which a projection 19*a* on the inner face of the cylindrical casing of operating pusher 14*a* rests on the top step. Here, recess 23*a* is overlapped by a web 31, so that in the zero position, projection 19*a*** secures the operating pusher against any axial movement, both in the operating direction, and also against the removal of said pusher.

To prevent any tilting of the operating pusher, the same arrangement can also be provided on the opposite side.

In the case of a setting to any random desired stroke value, the operating pusher can be pressed down to such an extent that projection **19*a* rests on the corresponding step 26*a***.

Figure 5:
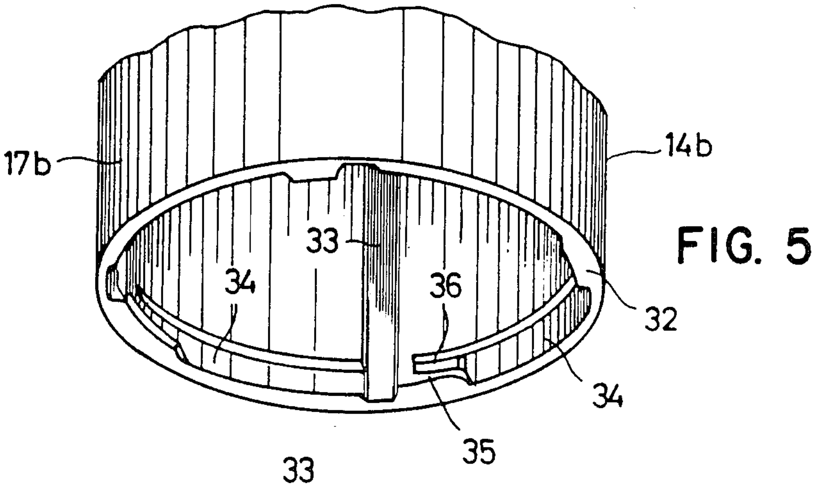
FIG. 5 a perspective view of the lower edge of an operating pusher with slots and projections formed therein.
Figure 6:
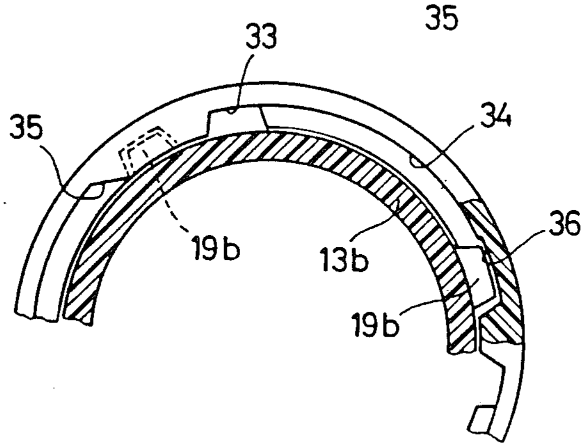
FIG. 6 a partial sectional view of the operating pusher according to FIG. 5, viewed from below, with a sectional part of the pump casing.

FIGS. 5 and 6 show a construction in which, in the vicinity of a lower edge 32, the operating pusher **14*b* has a system of recesses and webs, shaped with corresponding projections 19*b* on pump casing 13** or on a ring mounted thereon.

The system of recesses is arranged on the inner circumference of casing **17*b* of operating pusher 14*b* and comprises four identical system units. Each contains an axially directed slot 33, recessed into the inner wall of casing 17*b* and on to which follows a somewhat less recessed circumferential recess 34 in the vicinity of lower edges 32. This is open towards edge 32 and only at its end remote from slot 33 is it covered by a web 35 is such a way that a channel-like slot is formed in this short area, where there is a depression 36**.

The width and depth of the four projections **19*b* are defined in such a way that they can easily pass into recess 34 under slight contact pressure, whilst they can pass without hindrance into slot 33, which is even deeper than recess 34. In the latter position, the pump can be operated. However, if the operating pusher 14*b* is rotated into the inoperative position, so that the projections 19*b* pass into recess 34, then the pump is locked against operation. On further rotating up to end stop 37, the projections 19*b* enter the channel-like portion of recess 34, so that web 35 ensures that the operating pusher 14*b* cannot be removed. Depressions 36, together with projections 19*b*, form catches, which resiliently fix the operating pusher in this position. The rotation direction is selected in such a way that on screwing the pump, which is provided with a screw thread 40 (FIG. 7) on to a container of the operating pusher, it automatically assumes this safety rotation position, as shown in FIG. 6**. Thus, immediately after application of the pump to the container, the pump is secured for transportation purposes.

Figure 7:
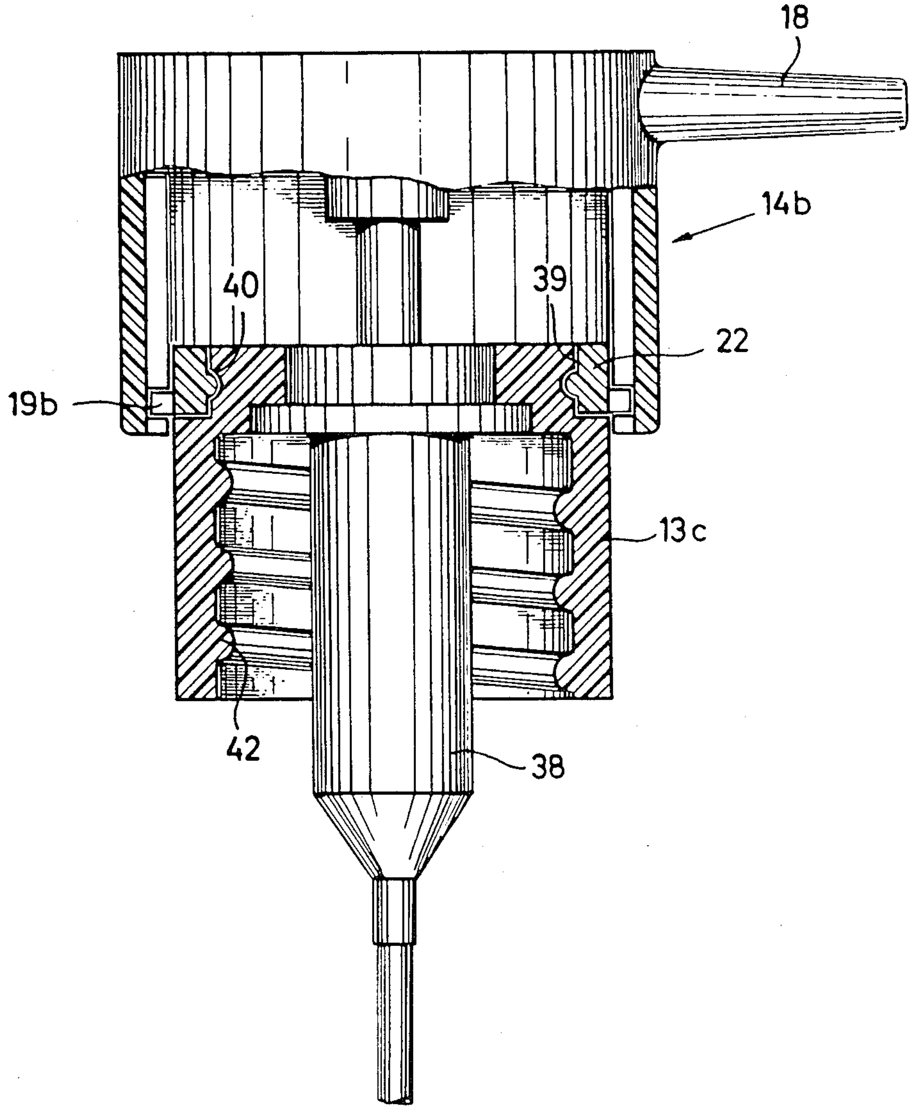
FIG. 7 a vertical partial section through the operating pusher and pump casing of a further embodiment.

FIG. 7 shows a construction, which operates with an operating pusher **14*b* according to FIGS. 5 and 6. In this case, the pump casing 13*c* contains pump cylinder 38** as a separately inserted part. However, the term pump casing generally covers all parts of the pump, which are fixed with respect to the container, or with respect to which the operating pusher moves axially.

A ring **22*c* is inserted in an annular edge recess 39 on pump casing 13*c* and is secured against axial movement by an annular bead 40 snapping into a corresponding slot, whilst its rotary movement is decelerated in a controlled manner. Four projections 19*b* cooperating with recesses 33, 34 are shaped on to the outer circumference of the ring, which is flush with the outer circumference of pump casing 13*c*. The arrangement of ring 22*c*, which can be rotated against a certain resistance, makes it possible for the operating pusher 14*b* to be turned into a random position, and from said basic position to perform the function described relative to FIGS. 5 and 6** (pump operation/blocked operation/safety position).

Figure 8:
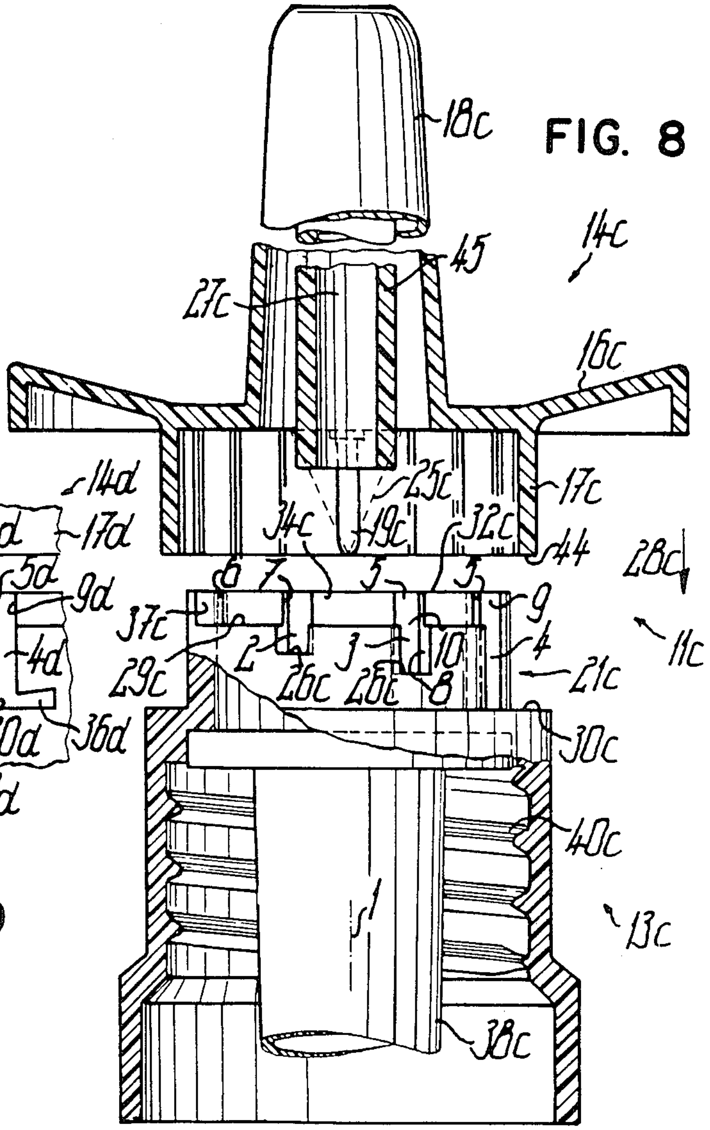
FIG. 8 an axial section through another embodiment of the invention.
Figure 9:
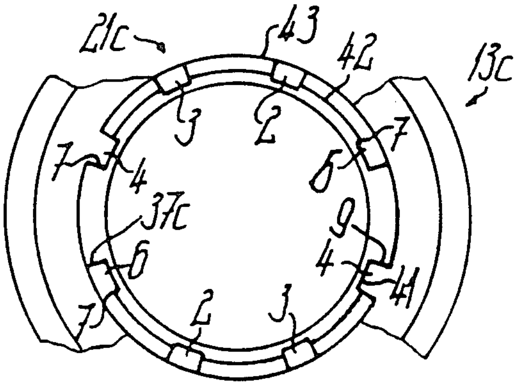
FIG. 9 a top view on the holding means according to FIG. 8.

This is important in order e.g. to turn the delivery pipe 18 into a position suitable for transportation, but at the same time axially securing the operating pusher. However, in place of the delivery pipe, it would also be possible to use an atomizing nozzle, or some other construction of the operating pusher. FIGS. 8 and 9 show a very advantageous embodiment of the invention. Pump structure **11*c* comprises a tubular holding means 13*c* for the pump cylinder 38*c* or pump unit which can be inserted into the holding means 13*c* resting against an inner ring shoulder provided axially adjacent to a neck-portion 21*c* forming an end or front face 32*c* of the holding means 13*c*. Operating pusher 14*c* is provided with a cylindrical jacket 17*c*. In assembled condition jacket 17*c* overlaps neck 21*c* already in the resting or initial position and is axially displaceable with respect to the neck 21*c*. Pusher 14*c* and neck 21*c* form abutment means controlling the length of pump stroke. until in its the utmost end position it rests against ring shoulder 30*c* protruding radially over the circumference of neck 21*c*** and formed by the end face of the part of holding means 13c bearing a thread 40c for fixing the holding means 13c on a correspondingly threaded container neck. The end face of jacket 17c is planar and rectangular to pump axis 1 and has a outer diameter slightly smaller than the outer diameter of ring sholder 30c.

Neck 21c has an outmost circumferential surface 43, said surface 43 in cross-sectional view being bordered by circles around the pump axis 1 and advantageously being substantially of cylindrical shape all over the axial length of neck 21c. In several regions the circumference of neck 21c is profiled by recesses, steps and grooves, forming control means coacting with two diametrically opposite web-like projections 19c on the cylindrical inner face of jacket 17c. In its initial, and any operation position, inner face of jacket 17c has a slight radial distance from surface 43 of neck 21c, thereby permitting a slight resilient deformation of jacket 17c. Projection 19c extends to end or front face 44 of jacket 17c and is reduced in width to this end to better locate into axial grooves 2,4 of neck 21c when operating pusher 14c is manually displaced along pump axis 1 for effecting a pump stroke. Grooves 2,3,4 are of different length, whereby the length is stepwise increased from a shortest groove 2 in one circumferential direction to a longest groove 4. Grooves 2,3,4 are offset from front face 32c of neck 21c, thereby forming receiving or immersing ends 10 for receiving projection 19c, said immersing ends 10 being offset with respect to the front face 32c by equal distances, this distance being about equal to the axial extension of the shortest groove 2. Adjacent to the immersing ends 10 of grooves 2,3,4 there is an arched path 34c extending from front face 32c to a ring shoulder penetrated by immersing ends 10 of grooves 2,3,4 and therefore divided into ring portion shoulders 29c. Ring portion shoulders 29c extend perpendicularly to pump axis 1 from the circumference of arched path 34c to outer surface 43. In the direction ring portion shoulders 29c extend in one direction to one outermost groove 4 which in the embodiment shown is the longest groove 4. In the opposite circumferential direction corresponding last ring portion 29c extends beyond the corresponding outermost groove 2, which in the embodiment shown is the shortest groove 2. Circumferential extension of all ring portion shoulders 29c is about the same. The width of each groove 2,3,4 is only slightly larger than the width of projection 19c, thereby guiding projection 19c positively during a pump stroke. Each groove 2,3,4 is bordered by an end face 26c rectangular to pump axis 1 and positioned on the end of groove 2,3,4 remote from immersing end 10 and front face 32. End faces 26c are stepwise displaced in axial direction with respect to each other, the end face of the longest groove 4 being formed by ring shoulder 30c. The end faces 26c and ring shoulder 30c provide stop and/or abutment shoulders for the tapered end of projection 19c. The bottom faces 41 of grooves 2,3,4 have a slightly bigger radial distance from pump axis 1 than corresponding radial inner face of projection 19c in not assembled condition, thereby providing a contact of this radial inner face with bottom faces 41 under a slight spring-loaded pressure and therefore providing a certain friction between projection 19c and control means of neck 21c during a pump stroke. On the other hand it is also possible to avoid this friction by providing a slight radial play between the radial inside face of projection 19c and the bottom face 41 in operation.

The grooves 2,3,4 are elongated along the entire arched path 34c, thereby dividing arched path 34c into connecting portions 42 positioned between flat end portions 5 of grooves 2,3,4. The bottom faces of flat end portions 5 are formed by elongations of bottom faces 41 and have the same radial distance from pump axis 1 as the latter. The depth of flat end portions 5 may be far less than one millimeter. The depth of grooves 2,3,4 and therefore of end faces 26c may be about one millimeter, the radial extension of ring portion shoulder therefore being of a value between the depth of grooves 2,3,4 and the depth of flat end portions 5, this extension being larger than the depth of flat end portions 5. Bottom faces 41 of grooves 2,3,4 and flat end portions 5 may be cylindrically arched around pump axis 1.

At least one side face of each flat end portion 5 forms a step-like catch-member 7 which has to be overcome by projection 19c positioned in respective flat end portion 5 and upon rotation of operating pusher 14c relative to neck 21c. In this case only upon a certain minimum rotation force applied to operating pusher 14c, projection 19c will be resiliently pushed back and will be able to jump on the corresponding connecting portion 42 of arched path 34c, thereby avoiding inadvertently turning of the operating pusher 14c out of the respective adjusted positioned corresponding to a predetermined output volume of the pump structure 11c. While rotationally sliding on the correspondingly connecting portion of arched path 34c, projection 19c is in higher friction contact with neck 21c than in the case of engaging any flat end portion 5 or groove 2,3,4, since the radial distance of each connecting portion 42 from pump axis 1 is slightly larger than the corresponding distance of bottom faces 41. In initial position of operating pusher 14c front end of projection 19c and end face 44 are positioned substantially in the plane of the ring portion shoulders 29c, whereby during movement of projection 19c out of the groove 2,3,4 and flat end portions 5 operating pusher 14c is prevented from any axial movement in the direction of the pump stroke. When arriving at flat end portion 5 upon turning, projection 19c will jump back into flat end portion 5, which can be felt by the user, and therefore securely indicates correct positioning.

Both circumferential ends of arched path 34c are provided with circumference stop means for projection 19c, these stop means being formed by stop faces 9, 37c. At the end adjacent to one outermost groove 4 which in the case shown is the longest groove 4, the stop face 9 is formed by the lateral groove face remote from the adjacent groove 3 and elongated to front face 32c. Therefore the corresponding flat end portion 5 is only provided with one catch member 7. The other stop face 37c is remote by a distance from the next adjacent groove 2, this circumferential distance being about the same distance between adjacent grooves 2,3,4. Directly adjacent to this stop face 37c the arched path 34c is provided with an axial flat groove 6 of equal dimensions like the flat end portions 5 except that this flat groove 6 does not continue into a groove but ends at the corresponding ring portion sholder 29c. Therefore there is another catch member 7 resiliently catching the projection 19c while abutting against stop face 37c. When projection 19c rests against stop face 37c and in flat groove 6, operation pusher 14c is in a non-operative security position where projection 19c rests axially against corresponding ring portion shoulder 29c extending up to stop face 37c. All grooves 2,3 between the outermost groove 4 and flat groove 6 are provided with two catch members 7 each, one on each side of the corresponding flat end portion 5. The flat end portions 5 have the same width as the grooves 2,3,4.

Projection 19c may extend to the inner end face of cap-like jacket 17c, this end face being provided with e.g. four ribs equally distributed around pump axis 1, so that in the end position of operating pusher 14c only these ribs will contact front face 32c. The inner circumferential surface of jacket 17c may be provided with a number of axial ribs of lesser heights than projection 19c, these ribs providing the only contact faces of jacket 17c for contacting circumferential surface 43 of neck 21c.

As can be seen in FIG. 9 the grooves 2,3,4 and the stop faces 9, 37c provide a groove unit extending over slightly less, e.g. about 40° less, than 180° around the pump axis 1. There are provided two such groove units diametrically opposite to each other, equal grooves 2,3,4, stop faces, ring portion shoulders, connecting portions etc. lying each symmetrically to a common axial plane of pump axis 1.

The operating pusher 14c is rotatably mounted on piston rod (not shown) by means of a tube section positioned inside nozzle 18c, forming part of the outlet channel 27c and plugged onto piston rod in a rotatable manner. Tube section 45 extends into jacket 17c, the free end of tube section 45 being positioned inside jacket 17c and remote from front face 44. At least one mark 25c may be provided on the outside circumference of jacket 17c, each mark 25c preferably being in alignment with one corresponding projection 19c. Corresponding markings may be provided on the outside of holding means 13c near ring shoulder 30c.

Figure 10:
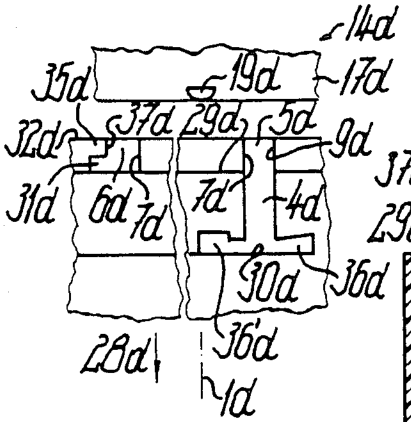
FIG. 10 a partial sectional side view of a further embodiment of the invention.

As FIG. 10 shows, means may be provided to secure operating pusher 14d in any rotational and axial position against movement opposite to pump stroke movement according to arrow 28d, thereby preventing withdrawal and/or plugging off operating pusher 14d from the remaining pump structure 11c. There is e.g. an undercut recess 31d in stop face 37d remote from front face 32d and in continuation of corresponding ring portion shoulder 29d, the recess 31d being adapted to receive projection 19d which in this case is not web-like but has an extension in the direction of pump axis 1d which is only slightly smaller than the corresponding extension of recess 31d. By means of recess 31d operating pusher 14d can be prevented from withdrawal in the initial position when operating pusher 14d is turned so far that projection 19d is received by recess 31d.

In the case of groove 4d there are two opposite recesses 36d, 36'd in both side faces of groove 4 and in lateral continuation of the corresponding end face and/or the ring shoulder 30d, both recesses being adapted to alternately receive projection 19d, thereby locking operation pusher 14d in both axial directions in the utmost axial operating position. Each recess, whether on the side of groove 4d remote from the next adjacent groove or on the opposite side may be provided with a catch either resiliently or positively securing projection 19d in the corresponding locking position. In the case of positively secured engagement there is a catch protruding towards the end face, or the ring shoulder 30d, respectively, over the inside face of recess 36'd opposite to this end face and bordering and inlet opening for projection 19d for moving into recess 36'd. To release operating pusher 14d, which is spring-loaded against the pump stroke direction according to arrow 28d, operating pusher 14d has to be pushed slightly in the direction of the pump stroke until it contacts ring shoulder 30d, whereupon it can be turned into groove 4d. In the other case the recess 36d has a tapered side face opposite to ring shoulder 30d thereby providing an inlet opening for projection 19d, said inlet opening having a slightly smaller extension parallel to pump axis 1d than the rest of the recess 36d. Therefore by turning projection 19d out of recess 36d into groove 4d the operating pusher 14d will automatically be moved against its spring-loading in the corresponding axial direction. Each of the other grooves not shown in FIG. 10 may as well be provided with one or two opposite locking recesses adjacent to their end faces, thereby enabling the operating pusher 14d to be locked in any operating end position.

What is claimed:

1. A variable-output dispensing pump structure (11c), comprising:

a base means (13c) holding a pump;

an operating pusher (14c) displaceable relative to the base means (13c) and relative to the pump from an initial position along a pump axis (1), for effecting a pump stroke by axial displacement of the operating pusher over a stroke length; and, control means for selecting a maximum length of possible axial displacement of the operating pusher (14c) before reaching a corresponding end position at which the operating pusher and the base means abut, the control means comprising:

a neck (21c) on the base means (13c), the neck (21c) and the operating pusher (14c) each having a control element mounted for manual rotation about the pump axis (1) relative to each other into at least two rotational operating positions; abutment means formed at least partly on the operating pusher (14c) and at least partly on the neck (21c), the respective parts of the abutment means abutting at different axial displacements for said at least two rotational operating positions to limit the length of the displacement of the operating pusher (14c) through a portion of a maximum possible axial length, the abutment means including an abutment shoulder for each of the at least two rotational operating positions, the abutment shoulders having radial end faces (26c) axially stepwise displaced relative to each other, the end faces (26c) defining axial ends of grooves (2, 3, 4) elongated axially and positioned around the pump axis (1), the abutment means also including at least one abutment projection (19c) protruding radially and having a radial end face for positively-guided sliding in the grooves (2, 3, 4), the radial end face of the abutment projection (19c) contacting one of the end faces (26c) at the corresponding end position, the radial end face of the abutment projection (19c) in the initial position of the operating pusher (14c) being positioned axially clear of the grooves (2, 3, 4), above ends (10) leading into the grooves, thereby permitting manual rotation of the control elements when in said initial position, and, an arched path protruding radially from the abutment means between the grooves (2, 3, 4) and connecting between the ends (10) leading into the grooves (2, 3, 4), the arched path (34c) extending around the pump axis (1) and having connecting portions (42) connecting between the ends leading into the grooves (2, 3, 4) and radially guiding the abutment projection (19*c*) during manual rotation in the initial position of the operating pusher (14*c*).

2. A pump structure according to claim 1, wherein said projection (19*c*) is an axial web having a length substantially equal to a length of a longest one (4) of the axial grooves (2, 3, 4).

3. A pump structure according to claim 1, wherein two projections (19*c*) are positioned opposite to each other, the grooves (2, 3, 4) being arranged in two opposite and equal groove units.

4. A pump structure according to claim 1, wherein the projection (19*c*) slides in frictional contact on a groove bottom face (41) of a respective one of the grooves by means of radial resiliency.

5. A pump structure according to claim 4, wherein the radial resiliency is provided by radial resiliency of a corresponding jacket-like (17*c*) control element (14*c*).

6. A pump structure according to claim 1, wherein the projection has a width only slightly smaller than a width of each groove (2, 3, 4), said grooves (2, 3, 4) having equal width.

7. A pump structure according to claim 1, wherein the arched path (34*c*) is axially preceded by an extension parallel to the pump axis substantially equal to a length of a shortest one (2) of the grooves (2, 3, 4).

8. A pump structure according to claim 1, further comprising means adapted for sliding of the projection with a higher friction along the connecting portion (42) than on portions (5) aligned with each groove (2, 3, 4).

9. A pump structure according to claim 1, wherein flat end portions (5) continuing main portions of the grooves (2, 3, 4) extend into the arched path (34*c*), said flat end portions (5) having a lesser depth than the main portions, a bottom face (41) of the flat end portions (5) of these grooves (2, 3, 4) extend axially to a front face (32*c*) opposite to the end faces (26*c*) of the grooves (2, 3, 4).

10. A pump structure according to claim 9, wherein said arched path (34*c*) and said flat end portions (5) of the grooves (2, 3, 4) extend axially to a front face (32*c*) opposite to the end faces (26*c*) of the grooves (2, 3, 4).

11. A pump structure according to claim 1, wherein the arched path (34*c*) is bordered by ring portion shoulders (29*c*) between the grooves (2, 3, 4), said ring portion shoulders (29*c*) forming abutment faces for the operating pusher (14*c*) against axial displacement in the initial position and at least in one rotational position.

12. A pump structure according to claim 11, wherein at least one of the ring portion shoulders (29*c*) extends to one stop face (37*c*) laterally bordering a flat groove (6) substantially equal to the flat end portions (5) of the groove (2, 3, 4) and in circumferential distance to a next one (2) of the grooves (2, 3, 4).

13. A pump structure according to claim 1, wherein at least one end of the arched path (34*c*) is bordered by a stop face (37*c*, 9) for the projection (19*c*), thereby stopping manual rotation of the operating pusher in at least one rotational end position.

14. A pump structure according to claim 13, wherein one stop face (9) is formed by a side face of a groove (4) positioned at a corresponding end of the arched path (34*c*).

15. A pump structure according to claim 1, wherein the end face (30*c*) of a longest one (4) of the grooves (2, 3, 4) is formed by a ring shoulder (30*c*) of a corresponding control element.

16. A pump structure according to claim 1, wherein one control element (21*c*) is integrally formed in one part with the base means (13*c*).

17. A pump structure according to claim 1, wherein one control element (19*c*) is formed integrally in one part with the operating pusher (14*c*) and is provided on a substantially cylindrical inside face.

18. A pump structure according to claim 1, wherein the operating pusher (14*c*) is mounted for manual rotation.

19. A pump structure according to claim 1, wherein the grooves (2, 3, 4) are provided on the neck and are overlapped by the operating pusher (14*c*), the operating pusher being cap-like.

20. A pump structure according to claim 1, wherein one of the control elements is a ring (22) rotationally mounted with respect to the base means (13) and the operating pusher (14) movable into at least said two rotational operating positions.

21. A pump structure according to claim 20, wherein alignable axial grooves (20, 23) are provided in the ring (22) and an axially adjacent portion (21) of the corresponding control element for engagement of the projection (19).

22. A pump structure according to claim 1, wherein a recess (36*d*) is provided on one of the control means for axially locking the operating pusher (14*d*) in at least one end position and one rotational position, thereby providing at least one locking position for the operating pusher (14*d*).

23. A pump structure according to claim 22, wherein the recess (36*d*) is provided in at least one side face defined by one of the grooves(4*d*) adjacent to a corresponding end face (26*d*).

24. A pump structure according to claim 1, wherein an undercut recess (31*d*) is provided for axially locking the operating pusher (14*d*) against removal in the initial position and at least one rotational position, thereby providing a locking position for the operating pusher (14*d*).

25. A pump structure according to claim 24, wherein the undercut recess (31*d*) is provided in a corresponding stop face (37*d*).

26. A pump structure according to claim 1, wherein means are provided for rotationally locking the operating pusher in at least one locking position, the base means (13*c*) being provided with a thread (40*c*) for fixing the base means on a container neck, the arrangement of one of said at least one of the locking positions of the operating pusher (14*c*) and the thread (40*c*) being such that upon screwing the base means (13*c*) onto the container neck, the operating pusher (14*c*) is forced into said locking position.

27. A variable-output dispensing pump structure (11*c*), comprising:

a base means (13*c*) for holding a pump;

an operating pusher (14*c*) displaceable relative to the base means (13*c*) from an initial position along a pump axis (1) for effecting a pump stroke; and, control means for selectively varying a maximum output of the pump structure (11*c*) for any stroke by varying a maximum length of possible axial displacement of the operating pusher (14*c*) before reaching a corresponding end position, the control means comprising:

a neck (21*c*) provided on the base means (13*c*), the neck (21*c*) and the operating pusher (14*c*) having two control elements mounted for manual rotation about the pump axis (1) relative to each other into at least two rotational operating positions; abutment means formed at least partly on both of two cooperating members formed by the operating pusher (14*c*) and at least partly on the neck (21*c*), respective abutment profiles (19*c*, 2, 3, 4) of the abutment means engaging one another in the rotational operating positions to limit a length of displacement of the operating pushers (14*c*) through a portion of the maximum length; and, catch means (7) for resiliently securing the control means in each of the rotational operating positions and in the initial position of the operating pusher (14*c*), said catch means (7) being formed by the abutment profiles (2, 3, 4) of one of said cooperating members.

28. A pump structure according to claim 27, wherein said catch means are formed by flat steps (7) between flat end portions (5) of grooves (2, 3, 4) receiving at least one abutment projection (19*c*) of said abutment means and connecting portions (42) between the grooves (2, 3, 4) defining an arched path (34*c*).

29. A pump structure according to claim 27, wherein said catch means (7) are formed by side faces of flat end portions (5) of grooves (2, 3, 4) receiving at least one abutment projection (19*c*) of said abutment means and defining said maximum length of possible axial displacement.

* * * * *

UNITED STATES PATENT AND TRADEMARK OFFICE
CERTIFICATE OF CORRECTION

PATENT NO. : 4,871,092

DATED : October 3, 1989

INVENTOR(S) : MAERTE

It is certified that error appears in the above-identified patent and that said Letters Patent is hereby corrected as shown below:

Column 1, line 31, delete "pup" and insert --pump--.

Column 2, line 68, delete "whilst" and insert --while--.

Column 4, line 10, delete "whilst" and insert --while--.

Column 4, line 39, delete "whilst" and insert --while--.

Column 4, lines 65 and 66, after "neck 21c.", delete "Pusher 14c and neck 21c form abutment means controlling the length of pump stroke.".

Column 5, line 11, after "neck 21c." insert --Pusher 14c and neck 21c form abutment means controlling the length of pump stroke.--.

Column 5, line 6, delete "sholder" and insert --shoulder--.

UNITED STATES PATENT AND TRADEMARK OFFICE
CERTIFICATE OF CORRECTION

PATENT NO. : 4,871,092

DATED : October 3, 1989

INVENTOR(S) : MAERTE

It is certified that error appears in the above-identified patent and that said Letters Patent is hereby corrected as shown below:

Column 5, line 39, after "the" and before "direction" insert --circumferential--.

Signed and Sealed this

Twenty-third Day of October, 1990

Attest:

HARRY F. MANBECK, JR.

*Attesting Officer*

*Commissioner of Patents and Trademarks*